United States Patent [19]

Verdi

[11] Patent Number: 4,525,236

[45] Date of Patent: Jun. 25, 1985

[54] DEVICE FOR THE INSERTION OF SMALL BLOCKING STRIPS OR RIBBONS FOR MULTIPLE SHEET MATERIAL

[75] Inventor: Guido Verdi, Milan, Italy

[73] Assignee: BAMA, SpA, Milan, Italy

[21] Appl. No.: 477,244

[22] Filed: Mar. 21, 1983

[30] Foreign Application Priority Data

Mar. 24, 1982 [IT] Italy ............................ 21308/82[U]

[51] Int. Cl.[3] ............................................ B32B 31/18

[52] U.S. Cl. .................................... 156/517; 156/256; 156/521; 156/522

[58] Field of Search ............... 156/293, 353, 513, 514, 156/517, 521, 523, 253

[56] References Cited

U.S. PATENT DOCUMENTS

| | | | |
|---|---|---|---|
| 3,081,815 | 3/1963 | Toensing | 156/521 |
| 3,385,747 | 5/1968 | Klein et al. | 156/522 |

*Primary Examiner*—Caleb Weston
*Attorney, Agent, or Firm*—McAulay, Fields, Fisher, Goldstein & Nissen

[57] ABSTRACT

In an automatic device for the insertion of small blocking strips or ribbons adapted for the insertion in the groups of mating holes of material consisting of laterally punched and coupled sheet groups, whereby each strip takes a U-shaped configuration and is fixed to the first and to the last sheet of the sheet group by means of adhesive areas provided in the strip itself, an improved structure of small strip inserting device, by which each small ribbon is cut from a continuous ribbon and inserted into position without special operation carried out on the receiving holes.

17 Claims, 7 Drawing Figures

DEVICE FOR THE INSERTION OF SMALL BLOCKING STRIPS OR RIBBONS FOR MULTIPLE SHEET MATERIAL

BACKGROUND OF THE INVENTION

The present invention relates to a device for the insertion of small blocking strips into multiple sheet material and, more specifically, for the insertion of removable small blocking strips into the perforations of laterally punched and coupled forms.

DESCRIPTION OF THE PRIOR ART

It is known that for a number of uses laterally punched forms are utilized which are coupled in a number of sheets, so that the side perforations are coincident. These coupled forms must be temporarily blocked to each other, so that as soon as necessary the forms may be detected from each other.

A widely used system is based on small ribbons or small paper strips, having adhesive areas provided on one of their surfaces, which are inserted in the mating holes of all the forms coupled to each other, and then folded in a "U" shaped, whereby said adhesive areas are engaged with the first and the last form in a position adjacent to the mating holes without interference with the intermediate forms. Consequently, by cutting the small strip at the mating holes, all the forms coupled to each other are caused to be instantaneously set free.

This system is based onto an automatic machine adapted to grasp the single small strip and insert it in the group of mating holes, it being thereafter U folded as above mentioned.

To date, however, that was only possible if the holes at which the small strip was applied were in advance enlarged or increased by their diameter with respect to the size normally used in the punched forms, as with a certain frequency the small ribbon or strip was otherwise not rightly inserted owing to the inserting device being easily offset with respect to the group of holes in which it had to be inserted.

Therefore, the subject machine had to be upstream provided with a hole enlarging device which was operated at predetermined intervals corresponding to the frequency at which the aforesaid small strips were inserted.

All this, as it is readily understandable, affects the small strip insertion rate and consequently the operating speed of the machine for the production of coupled forms. For an approximate evaluation of the negative incidence of the hole enlarging operation and small strip insertion on the whole rate of the entire form coupling cycle it will be enough to take into consideration that the coupling mechanisms may attain linear speeds of the continuous paper band, as formed by the forms joined along their opposite edges, up to 350 m/min. whereas the automatic machines for the application of small strips of the aforesaid type seldon may operate at linear speed of said paper band higher than 180 m/min.

PURPOSES OF THE INVENTION

The main purpose of the present invention is that of providing an automatic device for the insertion of small ribbons or strips onto forms, laterally punched and coupled in multiple groups, by which the aforesaid drawbacks are done away with, whereas the advantages of the system as above shortly described are maintained.

A more specific purpose of the present invention is that of providing a device of the aforesaid type in which the need of the hole enlargement operation at predetermined intervals is eliminated.

A further purpose of the present invention is that of providing a device of the aforesaid type which is of simple operation, of rugged structure and of easy maintenance, besides permitting the use thereof with whatever type of mechanism for the continous coupling of forms.

SUMMARY OF THE INVENTION

These purposes are achieved by means of a device for the insertion of small ribbons or strips, adapted to be inserted into groups of mating holes of sheet material, laterally punched and coupled in groups, whereby each small ribbon takes a U shape and is secured to the first and to the last sheets of the sheet group by means of adhesive areas as formed onto the small ribbon itself, the device being characterized by comprising feeding means for a continous ribbon adapted to be cut into the aforesaid small strips, means for the intermittent advancement of said ribbon along a predetermined path, cutting means adapted to engage said ribbon, according to a predetermined and adjustable frequency cross-wise with respect to the said intermittent advancement direction whereby said small strips are cut from said ribbon, supporting means, for said cutting means said supporting means being operated to carry out a first reciprocating motion in a direction perpendicular to said advancement direction of said ribbon, and to carry out a second reciprocating motion, in a plane perpendicular to the direction of said first reciprocating motion and means for the controlled displacement of a continuous strip of sheets coming from a sheet coupling device provided upstream of the device for the insertion of said temporarily blocking strips, said displacement means being engaged by said cutting means carrying therewith a just cut strip concomitantly with said second reciprocating motion of the said supporting means.

BRIEF DESCRIPTION OF THE DRAWINGS

The peculiar features and advantages of the present invention will more clearly appear from the following specification, with reference to the accompanying drawings wherein.

DESCRIPTION OF THE PREFERRED EMBODIMENT

Figure 6:
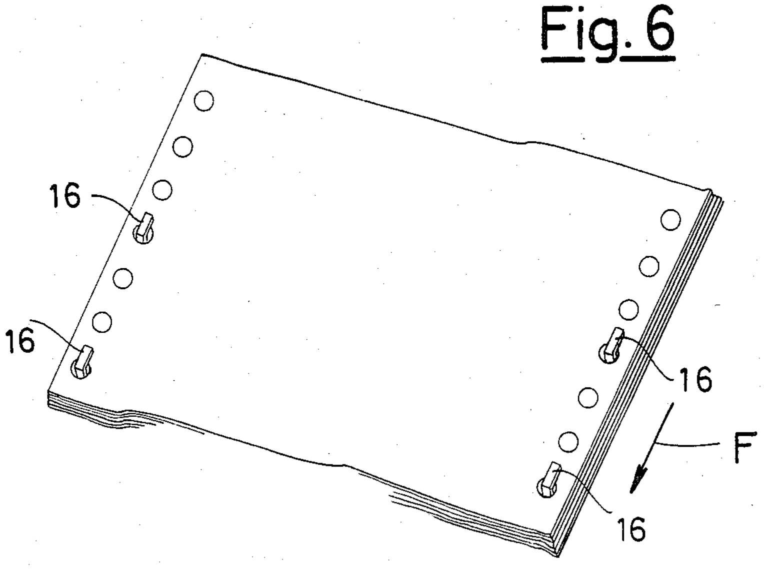
FIG. 6 is a diagrammatic view of a group of coupled forms which are blocked by means of the device of the invention.
Figure 7:
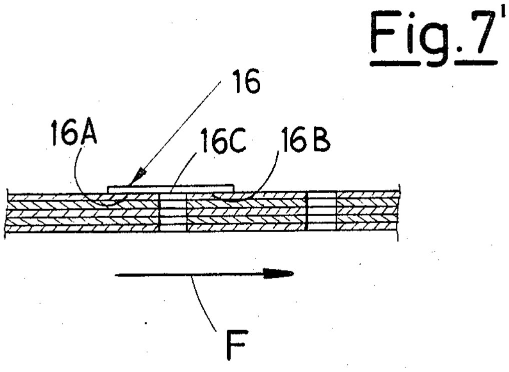
FIG. 7 is a cross-section view in detail.

With reference to the drawings, the device according to the invention includes a casing 10 at the top of which a plate 11 it is provided, an arm 12 being upwardly provided on said plate fitted to rotatably support a roll 14 of ribbon 15, from which the small strips or ribbons 16 (FIGS. 6 and 7) are to be cut for temporarily blocking the coupled forms.

Obviously the roll 14 is mounted and secured by means of a pair of conventional disks for supporting said roll which are idly mounted on a pin projecting from the arm 12.

Figure 1:
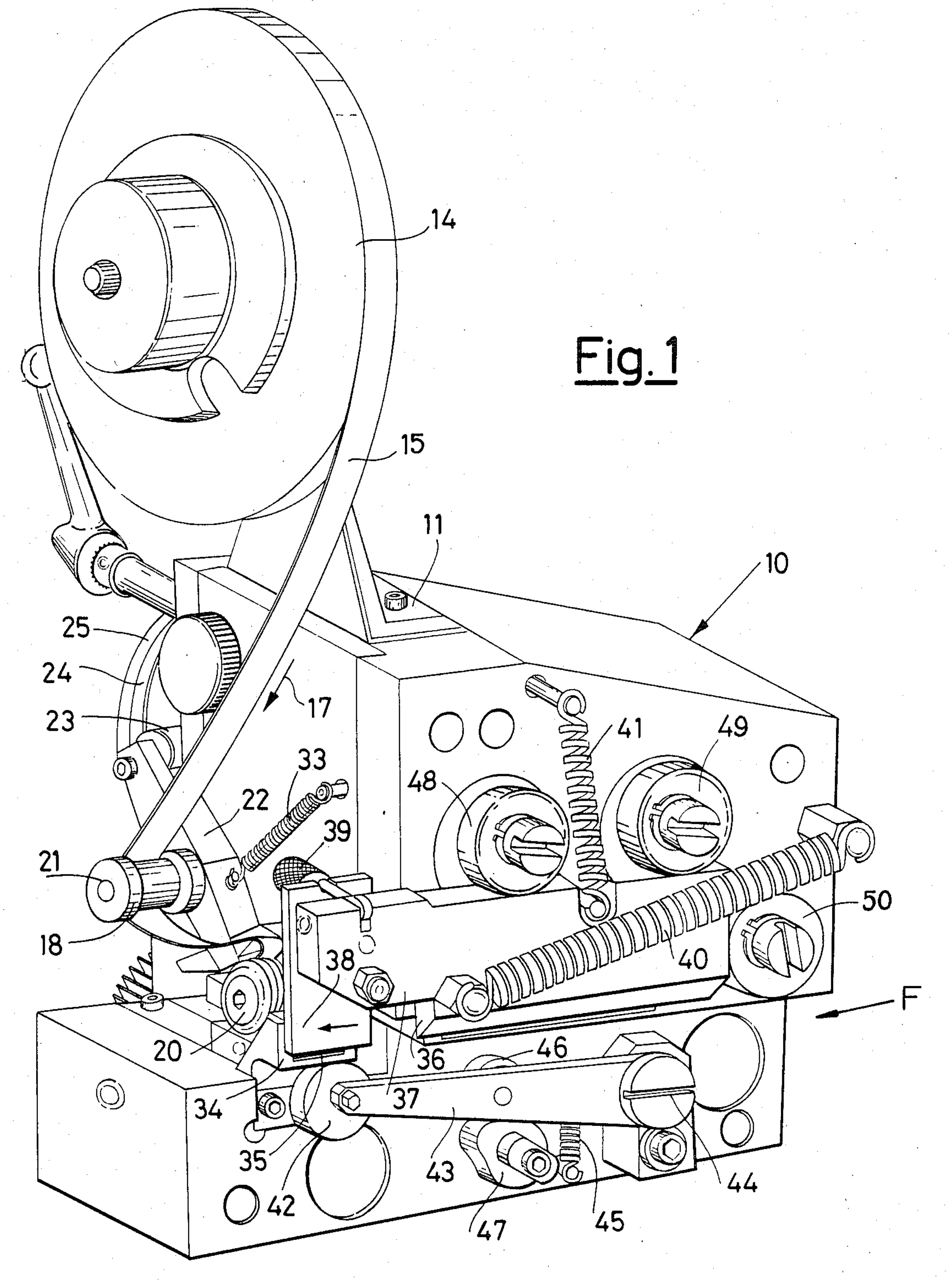
FIG. 1 is a general perspective view of the insertion device of the present invention.
Figure 2:
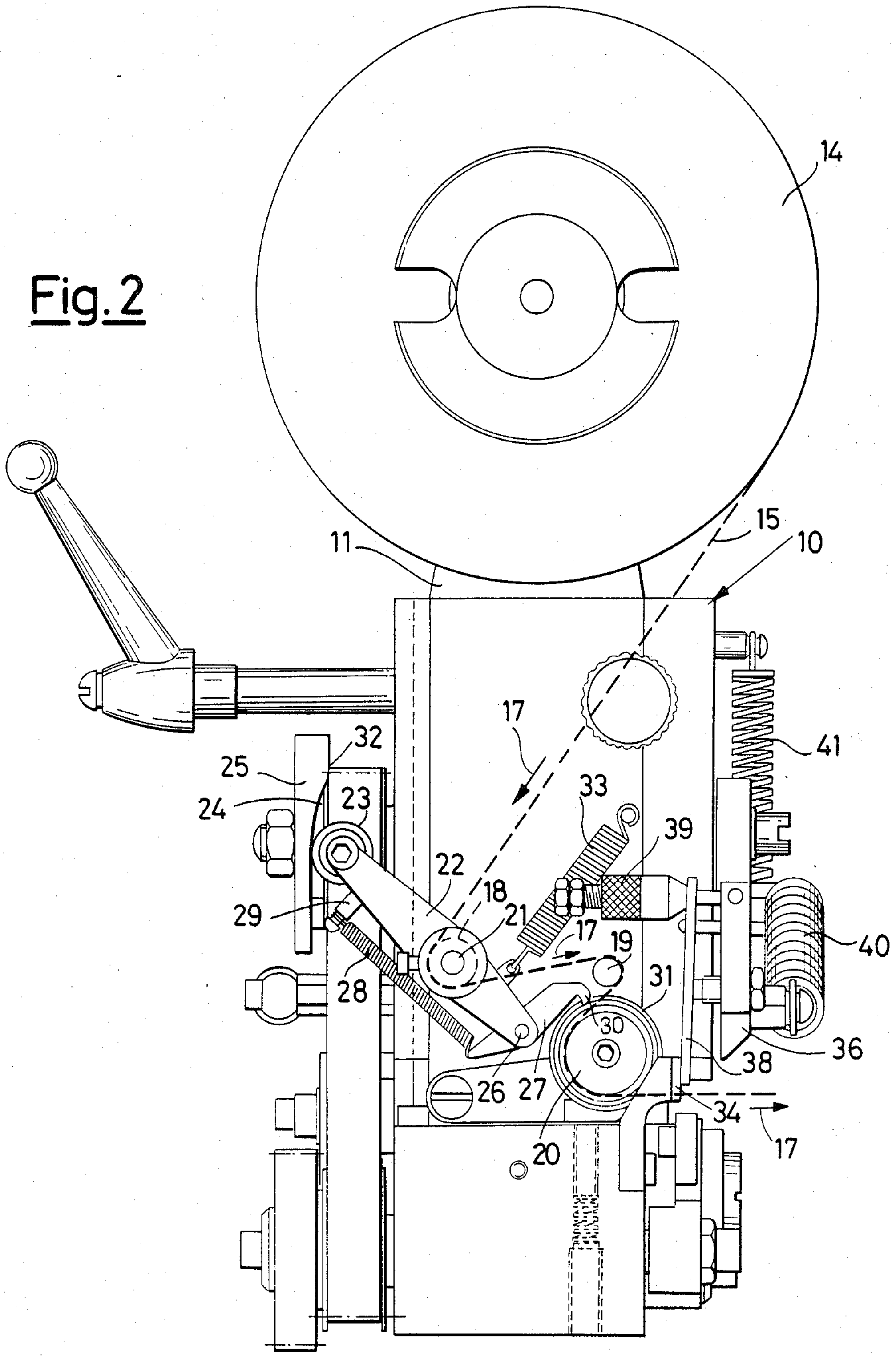
FIGS. 2, 3 and 4 are side views of the device of FIG. 1.
Figure 3:
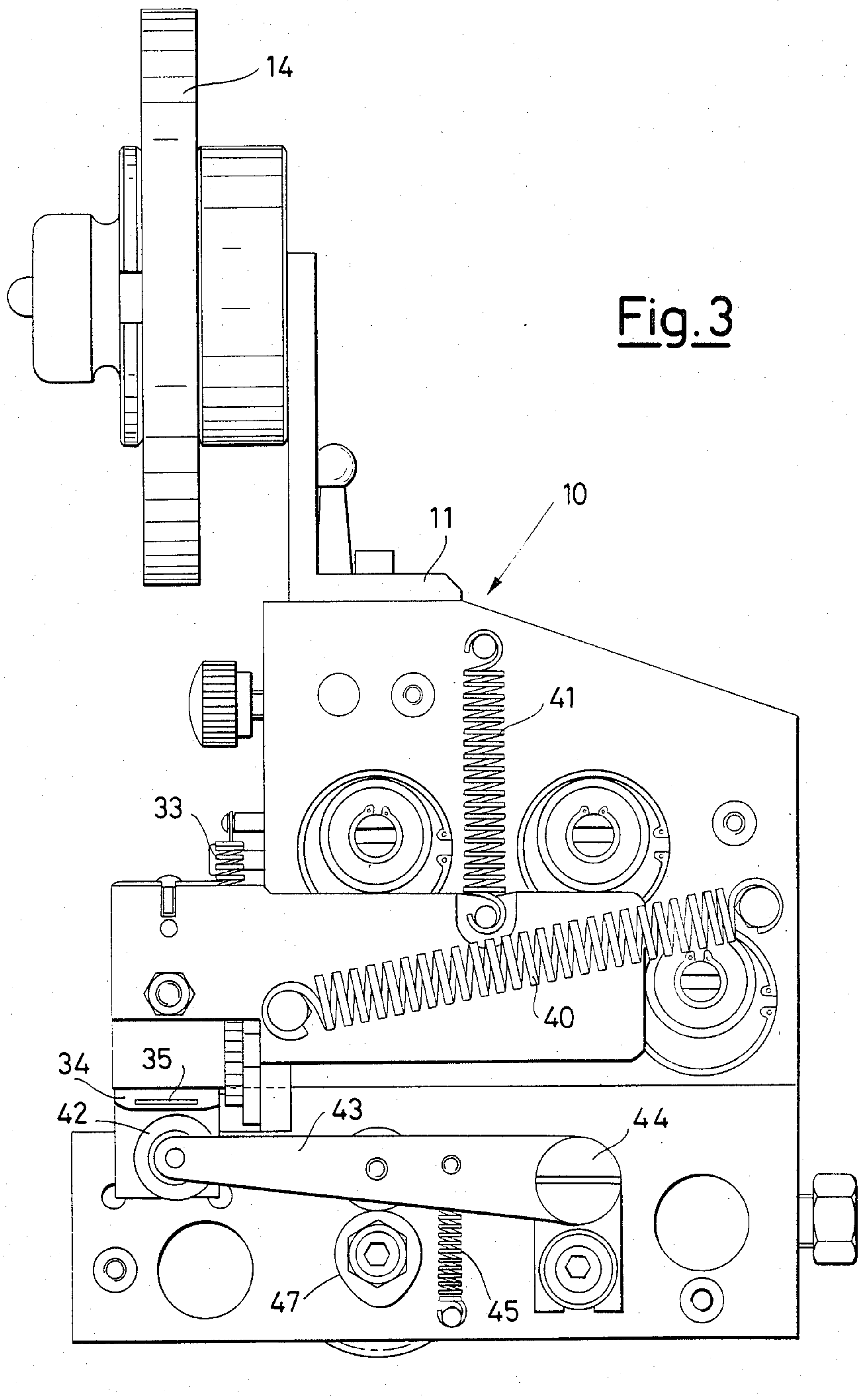
Figure 4:
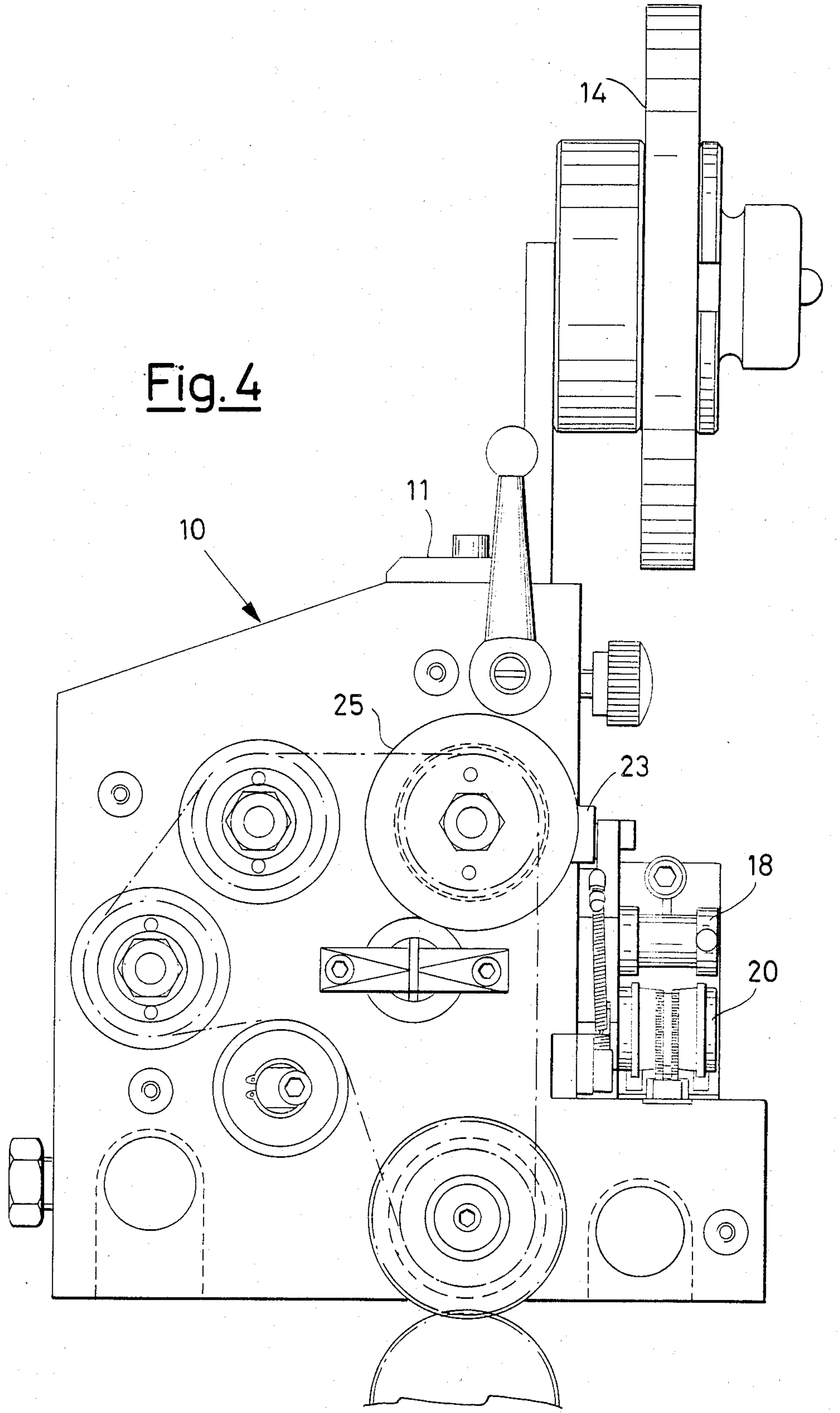
Figure 5:
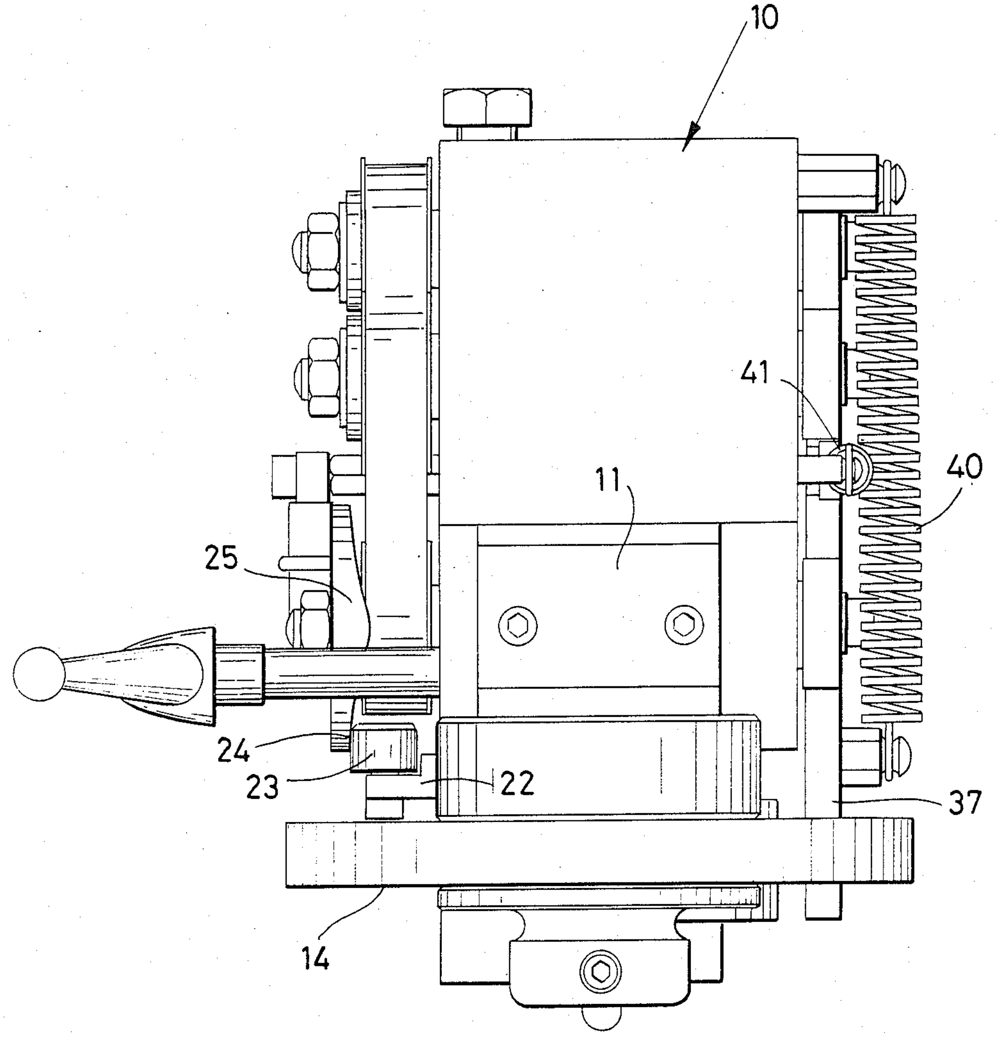
FIG. 5 is a plant from the top of the device of FIG. 1.

The path of the ribbon 15 is clearly shown by dashed lines in FIG. 2 and it advances in the direction of arrows 17.

The ribbon 15 in its advancement passes around a first roller 18, a guide roller 19 and an intermittently-driving roller 20.

The roller 18 is journalled onto a pin or fulcrum 21 of a lever 22, one end of which carries a roller 23 engaged with the operating surface 24 of a disk cam which is rotated at a predetermined and adjustable rate by driving means not shown.

A lever-shaped pawl 27 is provided journalled at the other end of the lever 22, one end of the pawl being joined to a return spring 28, the other end of said spring 28 being anchored to a pin 29 which integrally projects from the lever 22.

The toothed end 30 of the pawl 27 engages a crown gear 31 rigidly secured to the advancement roller 20, thus forming an escapement mechanism.

Each time the projecting portion 32 of the cam 25 engages with the roller 23 during the rotating motion, the lever 22 rotates around the fulcrum 21 thus pulling back the pawl 27, the tooth 30 of which is kept in engagement with crown gear 31 by the action of the spring 28.

Accordingly a corresponding rotation of the crown gear 31, together with the roller 20, takes place thus driving a portion of the ribbon 15 to be advnced in the direction of the arrow 17.

Obviously as soon as the unrelieved portion of the cam 25 comes into contact with the roller 23, the several elements come back to their starting positions due to the return action as applied to the lever 22 by the return spring 33 which is anchored to the device casing.

At the exit side of the roller 20, the ribbon 15 enters a guide 34 provided with a slit 35 through which the ribbon is caused to pass and to protrude by a prefixed length with respect to the vertical plane defined by the outer surface of the guide 34.

For the cutting of the protruding portion of the strip 15, a blade 36 is provided having a blade carrier 37, the latter having a spacing plate 38 mounted thereto, the position of which is adjustable by means of a screw 39 with respect to the blade-carrier.

The plate 38 in turn is slidably mounted to the other surface of the guide 34, and serves to define the distance from the slit 35, at which the blade 36 engages the protruding portion of the ribbon 15 from the said slit.

One end of a return spring 40 is secured to the blade-carrier 37, its other end being secured to the casing 10 of the device.

One end of a second return spring 41 is fixed to the blade-carrier 37, the other end being fixed to the casing 10 for the reasons set forth hereinafter. The assembly consisting of the blade 36, the blade carrier 37 and the spacing plate 38 is actuated so as to carry out two concomitantly reciprocating motions namely:

(a) an horizontal reciprocating motion against the opposing action of the spring 40 until the blade 36 is brought to a suitable position for cutting the portion of the ribbon 15 protruding from the slit 35 at the predetermined distance from the spacing plate 38;

(b) a vertical reciprocating motion against the opposing action of the return spring 41, the blade 36 being thus caused to be lowered to carry out the cutting operation. Below the slit 35 a displacement roller 42 is provided against which the portion of the ribbon 15 cut by the blade 36 is transferred.

This roller 42 is journalled at the end of a lever 43 fulcrumed at 44 and undergoing the action of a return spring 45, one end of which is secured to the lever itself whereas the other end is anchored to the casing 10.

A follower roller 46 is further secured to the lever 43 for engagement with a cam 47 which is driven into rotation, so that the lever 43 is raised or lowered according to a predetermined cycle.

Similarly the cams 48 and 49 control the vertical reciprocating motion of the blade-carrier 37, while the cam 50 controls the horizontal reciprocating motion thereof, the rotation rate of the cams being obviously adjustable according to the desired frequency of the corresponding reciprocating motion.

By combining the two aforestated reciprocating motions a resulting rod-and-crank-type motion is obtained by which the cutting and inserting operations of the small strip or ribbon with respect to the upper sheet or form of the group, which at that moment passes onto the roller 42, take place while accompanying the motion of the sheet itself.

In other words, provided that the continuous band of forms passing between the roller 42 and the slit 35 does not stop or reduce the speed it has when the small strip insertion takes place, the relative motion between the form and the small strip, as brought into position by the blade 36, is null.

This is thus the reason why by the present invention the stated purpose is achieved, and the production rate of the device is thus increased to that one of the related form coupling group.

The small strip 16 is then applied by its portion, which has to be inserted through the group of holes and to be U-folded, to the last sheet of the group of sheets in a flag-like arrangement for the full diameter of the group of holes, so that downstream of the device of the present invention the above stated operation will be carried out by a suitable punch.

The present invention has been described with reference to a preferred embodiment, although modifications, changes and equivalent embodiments are possible and foreseable, all based on the use of means for cutting and inserting the small strip or ribbons having a motion such that the relative motion between the small strip and the hole to which the same small strip is to be applied is null at the moment at which the said insertion takes place, without appreciable change of the displacement speed of the band of coupling forms being processed.

These modifications and changes are obviously included withing the scope of present invention.

I claim:

1. An apparatus for the preparation of blocking strips for insertion thereof into groups of mating holes of materials consisting of laterally punched and coupled sheet groups, whereby each strip has a U-shaped configuration and is fixed to the first and to the last sheet of the sheet group by means of adhesive areas provided in the strip itself, comprising:

means for feeding a continuous ribbon to be cut into small strips;

means for the intermittent advancement of said ribbon along a predetermined path;

cutting means operating at a predetermined and adjustable frequency for engaging said ribbon transversely with respect thereto and to the direction of intermittent advancement of the ribbon along said predetermined path so as to cut said strips from said ribbon;

supporting means for said cutting means, means for imparting two concomitantly reciprocating motions to said supporting means comprising first means for imparting to said supporting means a first reciprocating motion in a direction perpendicular to the predetermined path of said advancement direction of said ribbon and second means for imparting to said supporting means a second reciprocating motion in a direction perpendicular to the direction of said first reciprocating motion; and means for the controlled displacement of a continuous strip of sheets coming from a sheet coupling device provided upstream of a device for the insertion of the blocking strips, said displacement means being engaged by said cutting means carrying therewith a just cut small strip concomitantly with said second reciprocating motion imparting means, whereby no relatively motion exists between said cutting means carrying the cut strip and the upper sheet of the sheet group passing onto said displacement means.

2. Apparatus according to claim 1, wherein said feeding means comprise a roll or bobbin journalled to a support so as to permit unwinding.

3. Apparatus according to claim 1, wherein said intermittent advancement means comprise an advancement roller engaged by said ribbon coming from said feeding means, said roller being coupled to an escapement mechanism for driving said roller into rotation intermittently and in a predetermined direction.

4. Apparatus according to claim 1, wherein said continuous displacement means comprise a roller journalled at the end of a lever alternately driven in a vertical direction by cam means.

5. Apparatus according to claim 1, wherein said first and second reciprocating motion imparting means are controlled by cam means, and said supporting means is responsive to the action of respective opposing springs with respect to each of said reciprocating motion imparting means.

6. Apparatus according to claim 5, wherein said continuous displacement means comprise a roller journalled at the end of a lever alternatively driven in a vertical direction by cam means.

7. Apparatus according to claim 1, wherein said cutting means comprise a blade secured to said supporting means, an adjustable spacing plate between said blade and including a slit through which said ribbon is advanced by said advancement means.

8. Apparatus according to claim 7, wherein said slit is formed in a vertical guide, the outer surface of which is the reference plane for said spacing plate.

9. Apparatus according to claim 7, wherein said feeding means comprise a roll or bobbin journalled to a support so as to permit unwinding.

10. Apparatus according to claim 7, wherein said intermittent advancement means comprise an advancement roller engaged by said ribbon coming from said feeding means, said roller being coupled to an escapement mechanism for driving said roller into rotation intermittently and in a predetermined direction.

11. Apparatus for the preparation of blocking strips with adhesive thereon for the insertion thereof through groups of mating holes in materials of laterally punched and coupled sheet groups, with each said strip being fixed by means of the adhesive to the first and last sheet of the sheet group, comprising:

means for the intermittent advancement of a ribbon along a predetermined path to a cutting zone;

cutting means at said cutting zone operating at a predetermined and adjustable frequency for engagement transversely with respect to the ribbon for cutting thereof into strips;

means for supplying and controlling the displacement of a continuous strip of sheets from a sheet coupling apparatus provided upstream of said cutting zone;

supporting means for said cutting means;

first means for imparting a first reciprocating motion to said cutting means in a direction perpendicular to the predetermined path of said advancement direction of the ribbon in said cutting zone and second means for imparting a second reciprocating motion in a direction in a plane perpendicular to the direction of said first reciprocating motion; and said controlled displacement means cooperating with said supporting means for the transfer of a cut blocking strip to the last sheet of the sheet group while maintaining the cut strip and the coupled sheets free of relative motion for the subsequent insertion of the strips through the groups of mating holes of the coupled sheets.

12. Apparatus according to claim 11, wherein said controlled displacement means includes a displacement roller below said slit, the cut portion of the ribbon forming the strip being transferred to said displacement roller.

13. Apparatus according to claim 11, wherein said first motion means includes a first spring connected with said cutting means, and said second motion means includes a second spring connected with said cutting means.

14. Apparatus according to claim 11, wherein said cutting zone includes a guide provided with a slit through which the ribbon passes and to protrude by a prefixed length.

15. Apparatus according to claim 14, wherein said cutting means includes an adjustable blade carrier, a first spring affixed thereto forming said first reciprocating motion imparting means and a second spring affixed thereto to form said second reciprocating motion imparting means.

16. Apparatus according to claim 15, including cam means for controlling the vertical and horizontal motion of said blade carrier and said displacement means.

17. Apparatus according to claim 16, wherein said displacement means includes a displacement roller below said slit, the cut strips being transferred to said displacement roller raised and lowered according to a predetermined cycle by one of said cams, such that reciprocating motion of said blade carrier and said displacement roller are combined such that cutting and insertion operations of the strip with respect to the coupled group of sheets takes place at the moment the sheets pass onto said displacement roller so that the relative motion between the coupled group of sheets and the strip is null as the strip is brought into position by said cutting blade.

* * * * *